United States Patent [19]

Morimatsu et al.

[11] 4,133,801

[45] Jan. 9, 1979

[54] PROCESS FOR THE PREPARATION OF POLYESTERS

[75] Inventors: Yasuo Morimatsu; Toshio Tanaka, both of Matsuyama; Nobuya Okumura; Takeshi Horiuchi, both of Ehime, all of Japan

[73] Assignee: Teijin Limited, Osaka, Japan

[21] Appl. No.: 870,703

[22] Filed: Jan. 19, 1978

[30] Foreign Application Priority Data

Jan. 26, 1977 [JP] Japan .................................. 52-6852

[51] Int. Cl.² .............................................. C08G 63/30
[52] U.S. Cl. ...................................... 528/230; 528/273; 528/305; 528/277; 528/234
[58] Field of Search ..................................... 260/75 R

[56] References Cited

U.S. PATENT DOCUMENTS

| | | | |
|---|---|---|---|
| 3,701,757 | 10/1972 | Lazarus et al. | 260/75 R |
| 3,822,239 | 7/1974 | Chimura et al. | 260/75 R |

FOREIGN PATENT DOCUMENTS

33280/73  10/1973  Japan ..................................... 260/75 R

Primary Examiner—Lucille M. Phynes
Attorney, Agent, or Firm—Sughrue, Rothwell, Mion, Zinn and Macpeak

[57] ABSTRACT

A process for the preparation of polyesters by reacting a di-lower alkyl ester of a dicarboxylic acid consisting mainly of terephthalic acid with an alkylene glycol consisting mainly of ethylene glycol or tetramethylene glycol and thereafter polycondensing an obtained diglycol ester of the dicarboxylic acid and/or a low molecular weight condensate thereof, in the presence of (A) a lower alkyl p-formylbenzoate in an amount of about 50 – 1000 ppm, (B) a di-lower alkyl isophthalate in an amount of about 50 – 1000 ppm and (C) p-toluic acid and/or a mono-lower alkyl terephthalate in an amount of more than about 30 ppm, wherein the total amount of the compounds (A), (B) and (C) is not more than about 2000 ppm, to thereby form polyesters which have good qualities and excellent melt-forming properties.

7 Claims, No Drawings

PROCESS FOR THE PREPARATION OF POLYESTERS

BACKGROUND OF THE INVENTION

1. Field of the Invention

This invention relates to a process for the preparation of polyesters, in particular, to a process for the preparation of polyalkylene terephthalates having good qualities and excellent melt-forming properties by the ester-interchange reacting method.

2. Description of the Prior Art

The process for the preparation of polyesters, e.g., polyethylene terephthalate, by the ester-interchange reaction method consists of heating a mixture of a di-lower alkyl (1–4 carbon atoms) ester of terephthalic acid and ethylene glycol at a temperature approximately between 130 and 250° C. for about 2 to 5 hours at normal atmospheric pressure while removing the lower alcohol formed to complete the ester-interchange reaction, and thereafter heating the obtained di-ethylene glycol ester of terephthalic acid and/or a low molecular weight condensate thereof while removing ethylene glycol therefrom at a temperature between the melting point thereof and about 300° C. for about 2 to 5 hours at a reduced pressure of about 30 to 0.1 mm Hg to form polyethylene terephthalate.

The di-lower alkyl (1–4 carbon atoms) ester of terephthalic acid used in the aforesaid ester-interchange reaction method is industrially prepared from p-xylene by a method comprising the oxidation process of p-xylene. The SD process and the Witten process are the most widely employed methods. According to the SD process, p-xylene is oxidized with a molecular oxygen-containing gas, in the presence of a heavy metal catalyst and a bromine compound as the promotor, in a lower aliphatic acid solvent such as acetic acid, to form terephthalic acid, and the terephthalic acid thus formed is further esterified with a lower alcohol having from 1 to 4 carbon atoms to produce the di-lower alkyl ester of terephthalic acid. (See, for example, U.S. Pat. No. 2,833,816, Saffer et al., issued May 6, 1958.)

According to the Witten process, p-xylene is oxidized with a molecular oxygen-containing gas in the liquid phase in the presence of a heavy metal catalyst to form p-toluic acid, which is then esterified with a lower alcohol having from 1 to 4 carbon atoms to form a lower alkyl p-toluate, the lower alkyl p-toluate is again liquid phase-oxidized with a molecular oxygen-containing gas in the presence of a heavy metal catalyst to be converted to monoalkyl terephthalate, and the monoalkyl terephthalate is esterified with the lower alcohol to provide the di-lower alkyl ester of terephthalic acid. (See, for example, British patent specification No. 727,989, published Apr. 13, 1955, British patent specification No. 809,730, published Mar. 4, 1959.)

The di-lower alkyl ester of terephthalic acid obtained from p-xylene usually contains some impurities such as lower alkyl (1–4 carbon atoms) p-formylbenzoates, mono- or di-lower alkyl (1–4 carbon atoms) isophthalates, mono- or di-lower alkyl (1–4 carbon atoms) phthalates, p-toluic acid and mono-lower alkyl (1–4 carbon atoms) terephthalates in an amount of, e.g., more than about 1,000 ppm. (This di-lower alkyl ester of terephthalic acid is hereinafter referred to as the crude DAT.)

The aforesaid impurities contained in the crude DAT result in the formation of polyalkylene terephthalates having an unfavorable yellow color and lower the softening point of polyalkylene terephthalates. The crude DAT is, therefore, highly purified by a distillation and/or recrystallization processes to obtain the di-lower alkyl ester of terephthalic acid having, e.g., less than about 100 ppm of the total amounts of the impurities. (This di-lower alkyl ester of terephthalic acid is hereinafter referred to as the fiber grade DAT.)

The distillation and/or recrystallization processes, being complex ones as disclosed in, for example, Hydrocarbon Processing Vol. 54, No. 11 (November 1975), page 131–133, published by the Gulf Publishing Company, inevitably lead to high costs in the preparation of polyalkylene terephthalates. Therefore, it has strongly been desired in the synthetic fiber industry to complete a process for the preparation of polyesters having good qualities by using the di-lower alkyl ester of terephthalic acid containing more impurities than those contained in the fiber grade DAT.

The polyesters obtained by the ester-interchange reaction method have another disadvantage of poor melt-forming properties. In carrying out the ester-interchange reaction and the polycondensation reaction of the ester-interchange products, some metal compounds are used as catalysts to accelerate the reactions. These metal compounds remain in the obtained polyesters as insoluble and infusible foreign matters most of which have a diameter of more than about $20\mu$, and cause some troubles in the melt-forming process of the polyesters. In manufacturing polyalkylene terephthalate filaments, for example, the foreign matters build up around the spinning orifices of a spinneret pack when a molten polyalkylene terephthalate is melt-spun through the spinneret pack, and thus make it difficult to perform the smooth melt-spinning operation because of the resulting abrupt rise of the pressure in the spinneret pack and the breakage of spun filaments. Therefore, it has also been desired in the synthetic fiber industry to provide polyesters having good melt-forming properties.

Japanese Patent Application Publication No. 33280/73, Itabashi et al., published Oct. 12, 1973 discloses a process for the preparation of polyalkylene terephthalates having a good color which comprises reacting a di-lower alkyl ester of terephthalic acid with an alkylene glycol in the presence of an aromatic aldehyde-acid, such as 2-, 3- or 4-carboxybenzaldehyde, or an alkyl ester thereof and a cobalt compound, such as cobalt acetate. Since the alkyl esters of carboxybenzaldehydes (alkyl formylbenzoates) are contained as impurities in the crude DAT, this process is preferably used for preparing the polyalkylene terephthalates from the crude DAT. This process, however, does not overcome the disadvantage caused by foreign matters in the polyalkylene terephthalates.

SUMMARY OF THE INVENTION

The inventors conducted continued and strenuous studies about the influence of impurities contained in the crude DAT on the qualities and melt-spinning properties of the polyalkylene terephthalates. As the result of the strenuous studies, it has now been found that if a di-lower alkyl ester of terephthalic acid and an alkylene glycol is reacted in the presence of a specific amount of an alkyl p-formylbenzoate, and di-alkyl isophthalate and p-toluic acid and/or a mono-alkyl terephthalate, the above-mentioned disadvantages of the prior arts can be substantially overcome.

It is, therefore, one object of the present invention to provide a process for the preparation of polyesters having good qualities and melt-forming properties by mainly using a di-lower alkyl ester of terephthalic acid containing more impurities than the fiber grade DAT.

It is another object of the present invention to provide a process for the preparation of polyesters having good melt-forming properties by the ester-interchange reaction method.

The above-mentioned objects are attained by the process for the preparation of polyesters in accordance with the present invention, which comprises reacting a di-lower alkyl (1–4 carbon atoms) ester of a dicarboxylic acid at least 90 mol % of which consists of terephthalic acid with an alkylene glycol having from 2 to 10 carbon atoms at least 90 mol % of which consists of ethylene glycol or tetramethylene glycol and thereafter polycondensing an obtained di-glycol ester of the dicarboxylic acid and/or a low molecular weight condensate thereof, in the presence of (A) a lower alkyl (1–4 carbon atoms) p-formylbenzoate in an amount of about 50 to 1000 ppm, (B) a di-lower alkyl (1–4 carbon atoms) isophthalate in an amount of about 50 to 1000 ppm and (C) p-toluic acid and/or a mono-lower alkyl (1–4 carbon atoms) terephthalate in an amount of more than about 30 ppm, wherein the total amount of the compounds (A), (B) and (C) is not more than about 2000 ppm.

DESCRIPTION OF THE PREFERRED EMBODIMENTS

The process for the preparation of polyesters according to the present invention is conducted in the presence of (A) a lower alkyl (1–4 carbon atoms)

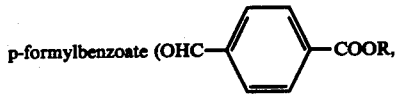
p-formylbenzoate (OHC—⟨ ⟩—COOR,

R is an alkyl radical having from 1 to 4 carbon atoms), preferably methyl p-formylbenzoate, (B) a di-lower alkyl (1–4 carbon atoms) isophthalate

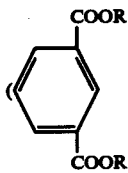

R is an alkyl radical having from 1 to 4 carbon atoms), preferably dimethyl isophthalate, (C) P-toluic acid

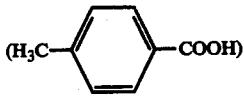
(H₃C—⟨ ⟩—COOH)

and/or a mono-lower alkyl (1–4 carbon atoms) terephthalate

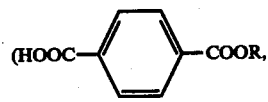
(HOOC—⟨ ⟩—COOR,

R is an alkyl radical having from 1 to 4 carbon atoms), preferably monomethyl terephthalate. The respective amounts of the compounds (A), (B) and (C) are about 50–1000 ppm, about 50–1000 ppm and more than about 30 ppm, and the total amount of the compounds (A), (B) and (C) is not more than about 2000 ppm.

The preferable amounts of the compounds (A), (B) and (C) are 50–500 ppm, 50–500 ppm and 30–200 ppm respectively, and the preferable total amount of the compounds (A), (B) and (C) is not more than 1000 ppm.

The compounds (A), (B) and (C) of the present invention work together to make the foreign matters, i.e., the metal compounds which have been used as the ester-interchange and/or the polycondensation catalysts, contained in the obtained polyesters, into fine particles most of which have a diameter of less than about 20μ. The particles of the metal compounds as fine as these reduce the occurrence of troubles in the melt-forming process of the polyesters.

When the amounts of the compounds (A), (B) and (C) are less than the above-mentioned ranges, the obtained polyesters do not have good melt-forming properties. On the other hand, when the amounts of the compounds (A), (B) and (C) are more than the above-mentioned ranges, the rate of polycondensation is reduced and the obtained polyesters have a yellow color and a lower softening point.

As the di-lower alkyl ester of terephthalic acid used in the present invention, there are dimethyl terephthalate, diethyl terephthalate, dipropyl terephthalate and dibutyl terephthalate. Dimethyl terephthalate is particularly preferable. In the present invention, the di-lower alkyl ester of terephthalic acid may be substituted with a di-lower alkyl (1–4 carbon atoms) ester of other aromatic dicarboxylic acids, such as isophthalic acid, phthalic acid and naphthalene dicarboxylic acid, a di-lower alkyl (1–4 carbon atoms) ester of aliphatic dicarboxylic acids, such as adipic acid and sebacic acid, or a lower alkyl (1–4 carbon atoms) ester of hydroxy carboxylic acids, such as p-(beta hydroxyethyl)benzoic acid, in an amount of 10 mol % or less based on the amount of the di-lower alkyl ester of terephthalic acid.

As the alkylene glycol used in the present invention, there are ethylene glycol, tetramethylene glycol and a mixture thereof. Ethylene glycol is particularly preferable. In the present invention, ethylene glycol or tetramethylene glycol may be substituted with other alkylene glycols having 3 and 5 to 10 carbon atoms, such as trimethylene glycol, pentamethylene glycol, hexamethylene glycol and cyclohexane-1,4-dimethanol, in an amount of 10 mol % or less based on the amount of ethylene glycol or tetramethylene glycol.

When the crude DAT obtained in accordance with, for example, the SD process or the Written process contains the compounds (A), (B) and (C) in an amount within the above-mentioned ranges, the crude DAT is used without being subjected to any further treatment in the present invention. When the crude DAT contains the compounds (A), (B) and (C) beyond the ranges stipulated in the present invention, the crude DAT can be refined by simple distillation and/or recrystallization processes, which satisfies the limitations provided in the present invention. In the present invention, it is preferable to use the crude DAT or the simply refined crude DAT, nevertheless a mixture of the fiber grade DAT and the crude DAT may be used to obtain the polyesters of the present invention. It is also possible to add the compounds (A), (B) and (C) to the fiber grade DAT to obtain the polyesters having good melt-forming properties.

In the present invention, a mixture of the di-lower alkyl (1–4 carbon atoms) ester of the dicarboxylic acid and the alkylene glycol is heated at a temperature between about 130° and about 250° C. for about 2 to 5 hours at normal atmospheric pressure while removing the lower alcohol formed in the presence of an ester-interchange catalyst to complete the ester-interchange reaction.

As such catalysts, for example, there are calcium compounds, such as calcium acetate, manganese compounds, such as manganese acetate, magnesium compounds, such as magnesium acetate, zinc compounds, such as zinc acetate, and cobalt compounds, such as cobalt acetate and cobalt dichloride. Calcium compounds, zinc compounds and manganese compounds are preferable, particularly manganese compounds are preferable. These catalysts are preferably used in an amount of 0.01 to 0.1 mol % based on the di-lower alkyl ester of the dicarboxylic acid used.

The di-glycol ester of the dicarboxylic acid and/or a low molecular weight condensate thereof obtained by the ester-interchange reaction are heated at a temperature between the melting point thereof and about 300° C. for about 2 to 5 hours at a reduced pressure of about 30 to 0.1 mm Hg while removing alkylene glycol therefrom in the presence of a polycondensation catalyst to form polyester.

As such catalysts, for example, there are antimony compounds, such as antimony trioxide, titanium compounds, such as tetrabutyl titanate, and germanium compounds, such as germanium dioxide and germanium tetraethoxide. These catalysts are preferably used in an amount of 0.003 to 0.1 mol % based on the di-lower alkyl ester of the dicarboxylic acid used.

In the present invention, the compounds (A), (B) and (C) are added to the reaction mixture before the initiation of the polycondensation reaction. Preferably, these compounds are to be added to the reaction mixture at a stage before or immediately after the initiation of the ester-interchange reaction. As mentioned above, the crude DAT containing the compounds (A), (B) and (C) in an amount within the ranges stipulated in the present invention can be used in that condition in the present invention.

In the present invention, it is possible and preferable to add a phosphorus compound to the reaction mixture as a stabilizer of polyesters. As the phosphorus compounds, there are phosphoric acid, phosphorous acid and an alkyl (1–6 carbon atoms) or phenyl ester thereof. The reaction product of an alkyl (1–6 carbon atoms) ester of phosphoric or phosphorous acid and glycols, e.g., ethylene glycol is also preferably used as the stabilizer in the present invention. The phosphorus compound is usually used in an amount represented by the following formula:

$$\frac{\text{Mols of an ester-interchange catalyst used}}{\text{Mols of a phosphorus compound used}} = 0.5 \sim 1.5.$$

The phosphorus compound is added to the reaction mixture toward the final stage of the ester-interchange reaction, preferably at a stage in which more than 90% of the ester-interchange conversion takes place. The phosphorus compound may be added to the reaction mixture in a solid state, in a liquid state or in the form of a glycol (e.g., ethylene glycol) solution or slurry.

In the present invention, it is possible to add a monofunctional compound, such as benzoic acid, benzylbenzoic acid, alkoxypolyalkylene glycols, salts of phenolsulfonic acid and salts of γ-hydroxypropane sulfonic acid in small quantities to the reaction mixture during the polycondensation to copolymerize the same with the terminals of the resulting polyester. It is also possible to copolymerize a trifunctional or more highly functional compound, such as glycerin, pentaerythritol or benzene tricarboxylic acid, with the resulting polyester, provided the polyester is substantially thermoplastic.

Still further, it is possible to optionally add a coloring agent, such as carbon black, pigments and dyestuffs, a delustering agent, such as titanium dioxide, a fluorescent agent, a color improving agent, such as cobalt acetate, an ultraviolet ray absorbent, an ether bond proofing agent, such as lithium acetate, sodium acetate or sodium methylate, a dyeing-ability increasing agent, a flame retardant, or an antistatic agent to the reaction mixture at any state of the reaction.

The compounds (A), (B) and (C) of the present invention work together to make the foreign matters, i.e., the metal compounds which have been used as the ester-interchange and/or the polycondensation catalysts, contained in the obtained polyesters, into fine particles most of which have a diameter of less than about 20μ. The particles of the metal compounds as fine as these reduce the occurrence of troubles in the melt-forming process of the polyesters. In the manufacture of polyester fibers, for example, it is possible to suppress the rise of the pressure in the spinneret pack during the melt-spinning of polyesters, which affords to reduce the number of spinneret pack exchange operations. In addition, the polyesters of the present invention can be melt-spun into filaments almost free from wrapping at the time of drawing. According to the present invention, a high-speed melt-spinning and high-speed drawing of the polyester can be easily accomplished.

The polyesters obtained in the presence of the compounds (A), (B) and (C) have almost the same qualities, such as good color and high softening point, as the conventional polyesters which are obtained from the fiber-grade DAT.

The present invention is more specifically illustrated in the following examples, in which parts are on a weight basis. The physical properties mentioned in the examples are defined as follows:

1. Intrinsic Viscosity [η]

Intrinsic viscosity is measured at 30° C. in orthochlorophenol.

2. Color

L and b denote those of Hunter's Color Diagram in which L represents lightness. The greater the L value, the lighter is the color. On the other hand, the positive side of b means yellow, and the negative side of b means blue. The greater the absolute value of b, the deeper is the color shade. The preferred L value of the polyester is more than 65 and b value is less than 5.5.

3. Softening Point (measurement by means of a penetrometer)

After heating the obtained polyester for 1 hour at 140° C., it is molded into a piece 2mm × 2mm × 1.5mm, which is placed below a plunger loaded with 10 grams. The part of the plunger which comes into contact with the piece is of a flat circular form of a diameter of 3mm. The temperature of the piece is then raised at a rate of 1.2° C. per minute. The point at which the plunger makes a 0.5mm descent as a result of the softening of the piece is electrically detected and the temperature at this time is designated as the softening temperature (softening point). The preferred softening point of polyethylene terephthalate is more than 262° C.

4. Distribution of Foreign Matters

A test flask fitted with a stirrer and a reflux condenser is charged with 20 parts of an obtained polyester and 150 parts of ethylene glycol, and the mixture is heated at a temperature of 190° C. for 3 hours to completely decompose the polyester. After cooling down to 25° C. with stirring, the resulting mixture is filtrated by using a filter paper having a mesh size of 3μ under a reduced pressure of 30 mm Hg. The foreign matters remaining on the filter paper are observed with an optical microscope at 200 magnifications, to measure the diameter and count the number of the foreign particles.

5. Pressure Rise in the Spinneret Pack

An obtained polyester is melt-spun at a temperature of 285° C. (except EXAMPLE 5 where the temperature is 260° C.) at a rate of 40 g/min (a melt-spinning speed of 1500 m/min) (except EXAMPLE 5 where the melt-spinning speed is 1400 m/min) through the spinneret pack having 36 spinneret orifices each having a diameter of 300μ. The pressure rise in the spinneret pack for melt-spinning polyester is shown by kg/cm$^2$G/day.

6. Ratio of Wrapping

Undrawn polyester filaments obtained in the preceding Test 5 are drawn between the feed roller and the draw roller at a draw ratio of 3.0 at a temperature of 85° C. (except EXAMPLE 5 where the draw ratio is 2.1 and the temperature is 25° C.) The drawn filaments are wound on the bobbin at a take-up speed of 1000 m/min. into a pirn of about 2.5 Kg.

The ratio of wrapping (broken filaments wrapping around the rollers) is designated as the number of the pirns in which wrappings have occurred per 100 bobbins. The preferred ratio of wrapping is less than 1.5.

EXAMPLES 1 and 2, COMPARATIVE EXAMPLES 1–4

A reaction vessel fitted with a stirrer and a rectifying column was charged with 100 parts dimethyl terephthalate which contains (A) methyl p-formylbenzoate, (B) dimethyl isophthalate and (C) p-toluic acid and monomethyl terephthalate in the amount as shown in Table I, 70 parts ethylene glycol and 0.063 parts (0.069 mol % based on dimethyl terephthalate) of calcium acetate monohydrate (an ester-interchange catalyst), following which an ester-interchange reaction was carried out by heating the mixture for 4 hours raising the temperature from 150° to 240° C. under normal atmospheric pressure while removing methanol formed. Thereafter, 0.029 parts phosphorous acid (a stabilizer), 0.04 parts antimony trioxide (a polycondensation catalyst) and 0.5 parts titanium dioxide (a delustering agent) were added to the ester-interchange product, following which a polycondensation reaction was carried out by heating the product for 4 hours at a temperature of 285° C. under a reduced pressure of 0.5–1 mm Hg.

The physical properties of the obtained polyesters were as shown in Table I below.

The polyesters according to Examples 1 and 2 of the present invention had high softening point and good color as the polyester in Comparative Example 1 which was obtained from the fiber grade dimethyl terephthalate. The pressure rise in the spinneret packs and the ratio of wrapping of the polyesters in Examples 1 and 2 were considerably less than the polyester in Comparative Example 1. The polyesters in Comparative Examples 2–4 did not have good color. In addition, the polyesters in Comparative Examples 1–3 had too much pressure rise in the spinneret packs and ratio of wrapping.

EXAMPLE 3

A reaction vessel fitted with a stirrer and a rectifying column was charged with 100 parts dimethyl terephthalate which contains 142 ppm of methyl p-formylbenzoate, 285 ppm of dimethyl isophthalate, 15 ppm of p-toluic acid and 60 ppm of monomethyl terephthalate, 70 parts ethylene glycol, 0.01 parts (0.009 mol % based on dimethyl terephthalate) of zinc acetate dihydrate (an ester-interchange catalyst) and 0.01 parts cobalt acetate tetrahydrate (a color improving agent), following which an ester-interchange reaction was carried out by heating the mixture for 3 hours raising the temperature from 150° to 240° C. under normal atmospheric pressure while removing methanol formed. Thereafter, 0.025 parts trimethyl phosphate (a stabilizer), 0.03 parts antimony trioxide (a polycondensation catalyst) and 0.4 parts titanium dioxide (a delustering agent) were added to the ester-interchange product, following which a polycondensation reaction was carried out by heating the product for 3 hours at a temperature of 285° C. under a reduced pressure of 1 mm Hg.

The physical properties of the obtained polyesters were as shown in Table I. The obtained polyester had excellent color.

EXAMPLE 4

A reaction vessel fitted with a stirrer and a rectifying column was charged with 100 parts dimethyl terephthalate which contains 142 ppm of methyl p-formylbenzoate, 285 ppm of dimethyl isophthalate, 15 ppm of p-toluic acid and 60 ppm of monomethyl terephthalate, 70 parts ethylene glycol and 0.038 parts (0.03 mol % based on dimethyl terephthalate) of manganese acetate tetrahydrate (an ester-interchange catalyst), following which an ester-interchange reaction was carried out by heating the mixture for 3 hours raising the temperature from 150° to 240° C. under normal atmospheric pressure while removing methanol formed. Thereafter, 0.088 parts of the reaction product (a stabilizer) of 0.022 parts trimethyl phosphate and 0.066 parts ethylene glycol (reacted at 140° C. for 5.5 hours), 0.04 parts antimony trioxide (a polycondensation catalyst) and 0.5 parts titanium dioxide (a delustering agent) were added to the ester-interchange product, following which a polycondensation reaction was carried out by heating the product for 3 hours at a temperature of 285° C. under a reduced pressure of 1 mm Hg.

The physical properties of the obtained polyester were as shown in Table I. The obtained polyester had excellent melt-forming properties.

EXAMPLE 5

A reaction vessel fitted with a stirrer and a rectifying column was charged with 100 parts dimethyl terephthalate which contains 284 ppm of methyl p-formylbenzoate, 569 ppm of dimethyl isophthalate, 66 ppm of p-toluic acid and 33 ppm of monomethyl terephthalate, 65 parts tetramethylene glycol and 0.74 parts (0.042 mol % based on dimethyl terephthalate) of tetrabutyl titanate (an ester-interchange catalyst and a polycondensation catalyst), following which an ester-interchange reaction was carried out by heating the mixture for 5 hours raising the temperature from 130° to 175° C. under normal atmospheric pressure while removing methanol formed.

Thereafter, a polycondensation reaction was carried out by heating the product for 4.5 hours at a temperature of 240° C. under a reduced pressure of 0.5-1 mm Hg.

The physical properties of the obtained polyester were as shown in Table I. The obtained polybutylene terephthalate had excellent color and melt-forming properties.

TABLE I

| | Compound (ppm) | | | | | Properties of the Obtained Polyesters | | | |
| | (A) methyl p-formyl-benzoate | (B) dimethyl iso-phthalate | (C) | | | | | Color | |
| | | | p-toluic acid | monomethyl tere-phthalate | Total | [η] | Softening point (° C) | L | b |
|---|---|---|---|---|---|---|---|---|---|
| Example 1 | 142 | 285 | 15 | 60 | 502 | 0.636 | 262.8 | 66.8 | 5.1 |
| Example 2 | 284 | 569 | 66 | 33 | 952 | 0.637 | 262.8 | 66.7 | 4.9 |
| Comparative Example 1 | 3.8 | 3.2 | 0.5 | 10.3 | 17.8 | 0.637 | 263.0 | 68.3 | 5.5 |
| Comparative Example 2 | 20 | 176 | 82 | 102 | 380 | 0.639 | 263.0 | 64.3 | 5.0 |
| Comparative Example 3 | 65 | 1572 | 305 | 284 | 2226 | 0.639 | 262.0 | 61.0 | 6.1 |
| Comparative Example 4 | 1308 | 1144 | 216 | 273 | 2941 | 0.637 | 262.1 | 65.0 | 6.5 |
| Example 3 | 142 | 285 | 15 | 60 | 502 | 0.605 | 261.9 | 67.5 | 3.4 |
| Example 4 | 142 | 285 | 15 | 60 | 502 | 0.639 | 262.6 | 70.0 | 4.0 |
| Example 5 | 284 | 569 | 66 | 33 | 952 | 1.06 | 225.5 | 78.5 | −0.7 |

| | Properties of the Obtained Polyesters | | | | | | |
| | Distribution of Foreign Matters (No.) | | | | | Pressure Rise inSpinneret Pack (Kg/cm²G/day) | Ratio of Wrapping (No.) |
| | 3–10μ | 11–20μ | 21–30μ | 31–50μ | 51μ < | | |
|---|---|---|---|---|---|---|---|
| Example 1 | 14 | 110 | 60 | 19 | 3 | 3.4 | 0.8 |
| Example 2 | 11 | 129 | 50 | 15 | 4 | 3.5 | 1.0 |
| Comparative Example 1 | 10 | 34 | 87 | 115 | 77 | 6.1 | 2.0 |
| Comparative Example 2 | 19 | 121 | 70 | 25 | 4 | 7.2 | 1.5 |
| Comparative Example 3 | 14 | 112 | 85 | 37 | 12 | 8.5 | 1.7 |
| Comparative Example 4 | 12 | 102 | 79 | 32 | 10 | 4.1 | 1.8 |
| Example 3 | 3 | 36 | 40 | 9 | 1 | 2.5 | 0.8 |
| Example 4 | 3 | 15 | 30 | 8 | 1 | 1.2 | 0.7 |
| Example 5 | 3 | 4 | 1 | 2 | 0 | 1.0 | 1.0 |

What is claimed is:

1. A process for the preparation of polyesters which comprises reacting a di-lower alkyl (1–4 carbon atoms) ester of a dicarboxylic acid at least 90 mol % of which consists of terephthalic acid with an alkylene glycol having from 2 to 10 carbon atoms at least 90 mol % of which consists of ethylene glycol or tetramethylene glycol and thereafter polycondensing an obtained diglycol ester of the dicarboxylic acid and/or a low molecular weight condensate thereof, in the presence of (A) a lower alkyl (1–4 carbon atoms) p-formylbenzoate in an amount of about 50 to about 1000 ppm, (B) a di-lower alkyl (1–4 carbon atoms) isophthalate in an amount of about 50 to about 1000 ppm and (C) p-toluic acid and/or a mono-lower alkyl (1–4 carbon atoms) terephthalate in an amount of more than about 30 ppm, wherein the total amount of the compounds (A), (B) and (C) is not more than about 2000 ppm.

2. The process of claim 1, wherein the respective amounts of the compounds (A), (B) and (C) are from 50 to 500 ppm, from 50 to 500 ppm and from 30 to 200 ppm, and the total amount of the compounds (A), (B) and (C) is not more than 1000 ppm.

3. The process of claim 1, wherein the di-lower alkyl (1–4 carbon atoms) ester of the dicarboxylic acid is dimethyl terephthalate.

4. The process of claim 1, wherein the alkylene glycol having from 2 to 10 carbon atoms is ethylene glycol.

5. The process of claim 1, wherein the alkylene glycol having from 2 to 10 carbon atoms is tetramethylene glycol.

6. The process of claim 1, wherein the compounds (A), (B) and (C) are respectively (A) methyl p-formylbenzoate, (B) dimethyl isophthalate and (B) p-toluic acid and/or monomethyl terephthalate.

7. The process of claim 1, wherein the ester-interchange reaction is conducted in the presence of a catalytic amount of manganese compounds.

* * * * *